United States Patent [19]

Blake et al.

[11] 4,229,664
[45] Oct. 21, 1980

[54] PHOTO ELECTRIC METHODS AND APPARATUS FOR REGULATING ELECTRICAL POWER CONSUMPTION IN STORES

[76] Inventors: Frederick H. Blake, 226 W. Edith Ave., No. 28, Los Altos, Calif. 94022; Manfred K. Dittmann, 2544 Sun Mor Ave., Mountain View, Calif. 94040

[21] Appl. No.: 20,755

[22] Filed: Mar. 15, 1979

[51] Int. Cl.³ .................... H05B 37/02; H01H 47/24
[52] U.S. Cl. .................................. 307/117; 307/157; 315/154
[58] Field of Search ................. 307/39, 117, 157, 311; 315/152, 153, 154, 155, 159; 340/600; 250/206, 214 AL; 361/173, 174, 175, 176, 177

[56] References Cited

U.S. PATENT DOCUMENTS

| | | | |
|---|---|---|---|
| 3,080,491 | 3/1963 | Howell | 307/117 |
| 3,989,980 | 11/1976 | Berman | 315/154 |
| 4,122,334 | 10/1978 | Owens | 315/153 X |

*Primary Examiner*—L. T. Hix
*Assistant Examiner*—James L. Dwyer
*Attorney, Agent, or Firm*—Brown & Martin

[57] ABSTRACT

In the disclosed apparatus, a photo diode has an electrical impedance representative of the ambient light intensity. An amplifier connects to this photo diode and converts the impedance to an analog signal whose magnitude indicates the ambient light intensity. The analog signal is compared via a first comparator with one reference voltage corresponding to the magnitude of analog signal that is generated by cloudy weather, and via another comparator to a reference voltage corresponding to the magnitude of signal that is generated at dusk. The first comparator operates to energize all window light in cloudy weather; and the second comparator operates to energize parking lot lights and electric signs at dusk. The second comparator also activates a timer which, after a manually selectable delay, de-energizes a uniformly distributed portion of all interior overhead lighting.

5 Claims, 3 Drawing Figures

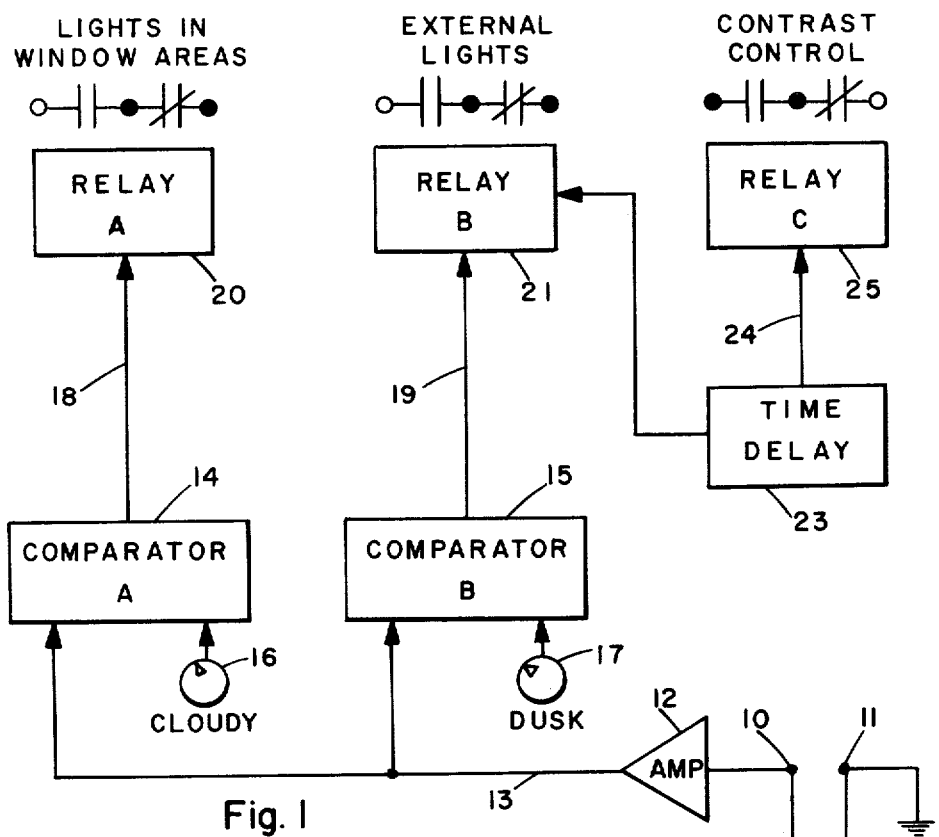
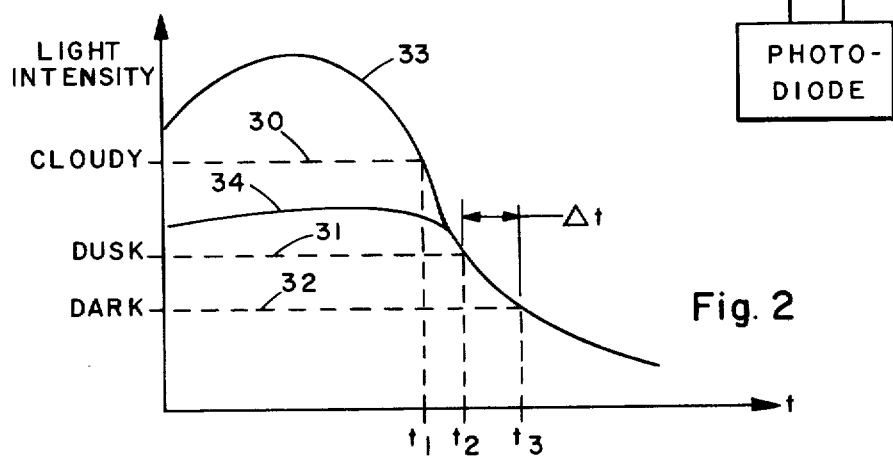

PHOTO ELECTRIC METHODS AND APPARATUS FOR REGULATING ELECTRICAL POWER CONSUMPTION IN STORES

BACKGROUND OF THE INVENTION

This invention relates to regulators for conserving electrical energy in stores and office buildings. Such regulators have become increasingly popular over the last several years due to the continually rising cost of electrical energy. The problem is particularly acute for example, in supermarkets. They have many large electrical loads, such as refrigeration that simply cannot be turned off to reduce cost. Typically, supermarkets have a monthly electrical bill of several thousand dollars.

At the same time, many stores, such as supermarkets operate on a low profit margin. Thus, a definite need exists in those businesses for an electrical energy regulator which is both inexpensive and can still reduce power consumption wherever possible. In the prior art, several electrical energy controllers existed. However, these were often found to be not suitable solutions. Many of the prior art controllers are general purpose controllers. They are designed to control energy consumption in a wide variety of industries. Typically, they include a computer or other sophisticated and expensive hardware. But as a result, they are over designed for the task of controlling energy consumption in a single predefined manner. Thus, they are too costly for many businesses.

Other prior art energy controllers simply include a timer which opens and closes various relays at selectable times of the day. The relays in turn control the flow of electrical energy to various circuits in the store. This type of control is also deficient however, in that its control is not sensitive to weather conditions. For example, it does not allow various lights to be turned on or off depending upon whether it is a cloudy day or a sunny day. Further, the timer requires seasonal adjusting to compensate for changes in the hour of sunrise and sunset.

The prior art also includes photo electric operated controllers. These controllers do not have the deficiencies that are associated with timers as described above; but they are deficient in several other respects. For example all of the prior art photo electric controllers have the capability of sensing only a single level of light ambient intensity. Thus, their degree of control is limited. Further, they are all incapable of sensing levels of light intensity that occur after dusk. Thus, no energy saving steps can be carried out past dusk. As a result, stores are often over illuminated when it is dark outside. Customers come in from the dark outside with their irises wide open, yet the store lighting is at a level resembling daylight. This lighting inbalance not only wastes energy, but often is annoying to the customer.

Therefore, it is one object of the invention to provide a relatively inexpensive controller for regulating the consumption of electrical energy in a predetermined manner.

Another object of the invention is to provide a photo electric energy regulator which senses multiple levels of ambient light intensity to achieve an improved degree of control.

Another object of the invention is to provide a photo electric energy regulator for performing control functions at light intensity levels below those corresponding to dusk.

Still another object of the invention is to provide a photo electric energy controller which dims the interior lights after dusk to provide a close contrast with the exterior light intensity.

SUMMARY OF THE INVENTION

These and other objects are accomplished in accordance with the invention by a controller that includes a photo diode and a control module. The photo diode is placed external to the store whose electrical energy consumption is to be controlled; and the control module is placed internal to the store. The photo diode has an electrical impedance representative of the ambient light intensity. This impedance is connected to an amplifier within the module via a pair of long wires. The amplifier converts the impedance to an analog signal having a magnitude indicating the ambient light intensity.

A pair of manually adjustable potentiometers are also included within the module for selecting first and second reference voltages. These voltages correspond to the magnitude of the analog signal which indicates cloudy weather and dusk. Both the reference voltages and the analog signal are fed to a pair of comparators. And the comparators generate respective control signals indicating when the ambient light intensity corresponds to cloudy weather or to dusk.

The control signal indicating dusk activates a timer, which in turn generates another control signal after a manually selectable delay. This control signal indicates the occurrance of total darkness. The three control signals operate respective relays. And the relay that is activated by the cloudy weather control signal energizes lights near windows in the store; the relay that is activated by the dusk control signal energizes electric signs and parking lot lights; and the remaining control signal de-energize a uniformity distributed portion of all interior overhead lighting.

BRIEF DESCRIPTION OF THE DRAWINGS

Various features and advantages of the invention will best be understood by reference to the following drawings when read in conjunction with the accompanying detailed description wherein;

FIG. 1 is a block diagram of a photo electric controller constructed according to the invention.

FIG. 2 is a set of curves illustrating the operating of the FIG. 1 controller.

DETAILED DESCRIPTION

Figure 3:
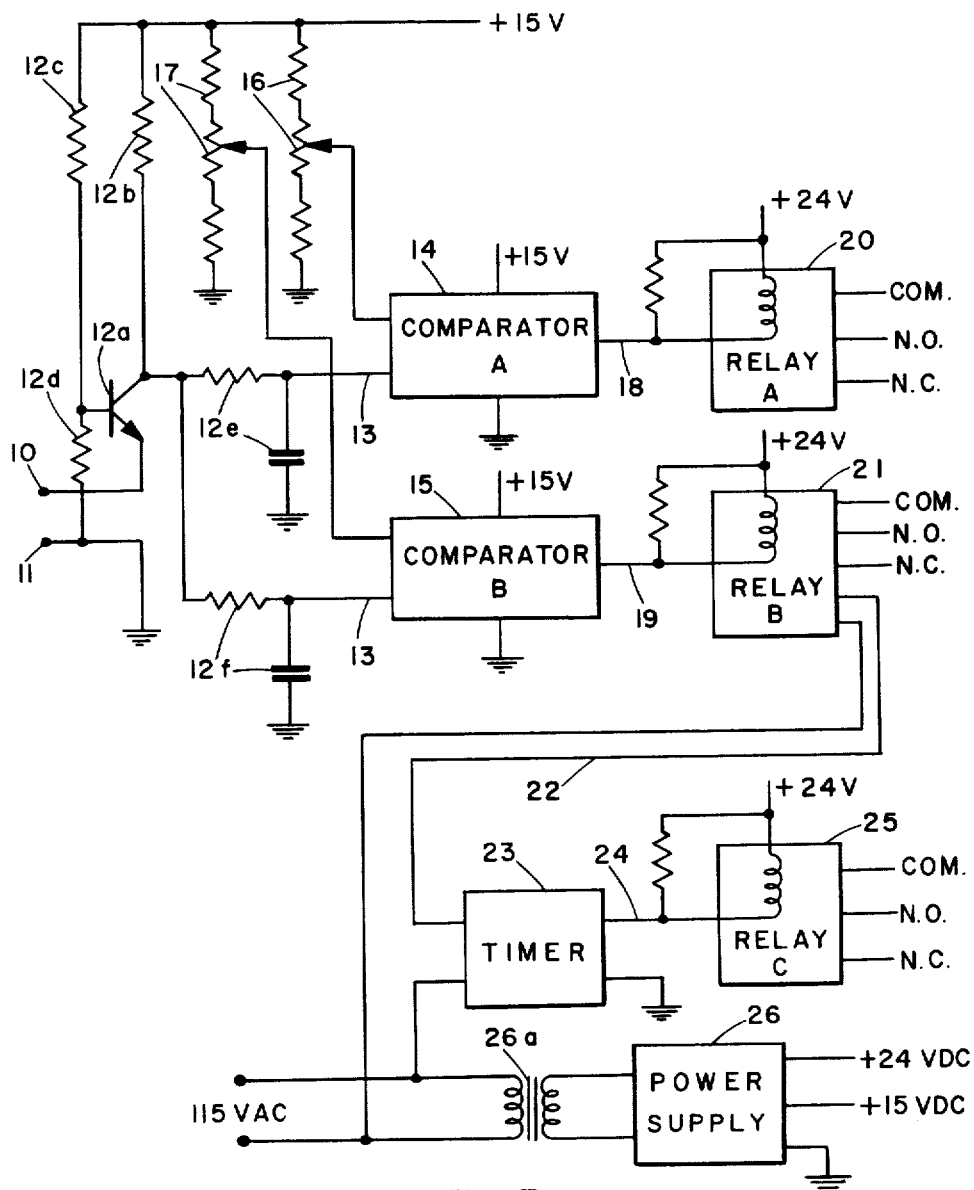
FIG. 3 is a detailed circuit diagram of the FIG. 1 controller.

Referring now to FIG. 1, there is illustrated a schematic diagram of a controller constructed according to the invention. Preferably, all of the components illustrated therein are packages within a single module. In operation, this module is installed within the store whose electrical energy is to be controlled. In addition, a photo diode is fixedly mounted external to the store, such as on the roof. This photo diode serially connects across terminals 10 and 11 of the FIG. 1 module via a pair of long wires.

In operation, the photo diode forms electrical impedances that are representative of the ambient light intensity exterior to the supermarket. These impedances are converted via an amplifier 12 into an analog signal having a magnitude that indicates the ambient light intensity. This signal is generated on a lead 13. Lead 13 in turn connects to one input of the pair of comparators 14 and 15. These comparators also have a second input that is connected to a selectable reference voltage potential. Reference numerals 16 and 17 respectively indicate the reference voltage potentials for comparators 14 and 15.

The reference voltage for comparator 14 is adjusted to correspond to the level of the analog signal on lead 13 that is produced by cloudy weather conditions. Thus, comparator A operates to generate a control signal on lead 18 which indicates when the ambient light intensity is less than or equal to that present in cloudy weather. Also, the reference voltage potential for comparator 15 is adjusted to correspond to that level of voltage that is produced on lead 13 at dusk. Accordingly, comparator 15 operates to produce an output control signal on a lead 19 which indicates when the ambient light intensity is less than or equal to that present at dusk.

The control signals on leads 18 and 19 are utilized to operate relays 20 and 21 respectively. In turn, relay 20 is serially inserted into the electrical circuit that energizes lights near the windows in the store; and relay 21 is inserted into the electrical circuit that energizes electric signs and parking lot lights for the store. Relay 21 also has an output that connects via a lead 22 to a timer 23. By this connection, timer 23 is activated when the signal on lead 19 initially indicating that the ambient light conditions correspond to dusk or less. After being activated for an adjustable time interval, timer 23 produces another control signal on a lead 24. This lead connects to a relay 25. And relay 25 is inserted into an electrical circuit that de-energizes a uniformly distributed portion of all of the interior overhead lighting in the store.

The overall operation of the FIG. 1 circuit during the course of a day may better be understood by reference to FIG. 2. There, time is plotted on the horizontal axis, and ambient light intensity is plotted on the vertical axis. Light intensities corresponding to cloudy, dusk and dark are respectively indicated via reference numerals 30, 31 and 32. Control signals on lead 18 indicate when the ambient light intensity is less than that corresponding to reference numeral 30; and control signals on lead 19 indicate when the ambient light intensity is less than that corresponding to reference numeral 31. Further, the control signal on lead 24 indicates when the ambient light intensity is less than that corresponds to reference numeral 32. This level of light intensity however, cannot be sensed directly by means of a photo diode. The reason is that with todays technology, photo diodes are not conductive in total darkness. Also, any light from adjacent buildings, parking lot lights, a full moon, and sky reflections make it all but impossible to directly sense when total darkness occurs. Thus, the total darkness level of light intensity is sensed indirectly by means of a time delay$\Delta T$ from the initial sensing of light intensity level 31.

Curves 33 and 34 in FIG. 2 indicate typical variations in ambient light intensity during the course of a working day. Curve 33 corresponds to sunny weather; whereas curve 34 corresponds to cloudy or stormy weather. During a sunny day, the window area lights are not turned on until time instant t1. Subsequently, at time instant t2, the parking lot lights and electric signs are turned on. Then after a time interval of $\Delta T$, a portion of all of the interior overhead lighting is turned off. In comparison, during a cloudy or stormy day, the window area lights remain on during the entire day. But the controlling of the parking lot lights, the electric lights, and the overhead lighting remains unchanged.

Referring now to FIG. 3, there is illustrated a detailed circuit diagram of one preferred embodiment of the invention. This figure can be correlated with FIG. 1 wherein like parts are indicated via like reference numerals. In the preferred embodiment, amplifier 12 is an emitter follower. It includes a transistor 12a and three bias resistors 12b-12d. The externally mounted photo diode connects in series with the emitter of transistor 12a. A pair of low pass RC filter networks 12e and 12f are included within amplifier 12 to eliminate any high frequency transients that may be induced therein by external noise sources. The output of these filters is connected to comparators 14 and 15.

The other inputs to the comparators come from the selectable reference voltage sources 16 and 17. Each of these is comprised of a potentiometer is relatively large, such as 100K ohms, to allow for a high degree of control over the light intensity level that is being sensed. This also allows for tolerances in the performance characteristics of comparators 14 and 15, transistor 12a and the photo diode to be cancelled out. The actual ajustment of the potentiometer is made only once during insulation via a pair of knobs on a control module that is mounted inside of the store.

The remaining portion of the FIG. 3 circuit may readily be constructed by utilizing standard parts. For example, comparators 14 and 15 may be comprised of standard high-gain differential amplifiers having suitable input and feedback networks. Similarly, relays 20, 21 and 25 may be comprised of standard 24 volt relays. Also timer 23 may be an Eagle BR19A6 timer for example. The operating voltages of 24 volts and 15 volts which these components use is furnished by a power supply 26. Suitably, this power supply is also a standard commercial part which simply includes a step down transofmer 26a and some internal RC low pass filters for voltage level stability.

A preferred embodiment of the invention has now been described in detail. This embodiment is now commercially identified as the Tritronic Model #SP-9050. In addition however, many changes and modifications may be made thereto without departing from the nature and spirit of the invention. For example, if a store has no windows, the above described comparator A and its associated circuitry could be eliminated. Thus, it is to be understood that the invention is not limited to said details but is defined by the appended claims.

We claim:

1. A controller for automatically regulating the consumption of electrical energy in a store, said controller being comprised of;

photo diode means for placement external to said store to form electrical impedances representative of the ambient light intensity, amplifier means having inputs connected to said photo diode and being responsive to the impedance thereof for generating an analog signal having a magnitude indicating said ambient light intensity;

means for manually selecting first and second reference voltage respectively corresponding to those magnitudes of said analog signal produced by cloudiness and dusk;

first comparator means having inputs coupled to simultaneously receive said analog signal and said first refererence voltage for generating a first control signal indicating when said ambient light intensity corresponds to cloudy weather;

second comparator means having inputs coupled to simultaneously receive said analog signal and said second reference voltage for generating a second control signal indicating when said ambient light intensity corresponds to dusk;

timer means for generating a third control signal after a manually selectable time delay in response to the initial occurrance of said second control signal to indicate full darkness; and a first electromagnetic switch operable in response to said first control signal for energizing lights near windows in said store, a second electromagnetic switch operable in response to said second control signal for energizing electric signs and parking lot lights for said store, and a third electromagnetic switch operable in response to said third control signal for de-energizing a uniformly distributed portion of all interior overhead lighting in said store.

2. A controller according to claim 1 wherein said amplifier means, means for manually selecting, first and second comparator means, timing means, and first second and third electromagnetic switches are all packages as a single integrated unit for installation within said store, and wherein said externally located photo diode connects thereto via a pair of wires.

3. A controller according to claim 2 wherein said unit includes first, second and third control knobs for respectively selecting said first reference voltage, second reference voltage, and time delay.

4. A controller according to claim 3 wherein said amplifier is an emitter follower and said photo diode connects to the emitter thereof via said pair of wires.

5. A controller for automatically regulating the consumption of electrical energy in a store, said controller being comprised of;

photo diode means for placement external to said store to form electrical impedances representative of the ambient light intensity, amplifier means having inputs connected to said photo diode and being responsive to the impedance thereof for generating an analog signal having a magnitude indicating said ambient light intensity;

means for manually selecting a reference voltage corresponding to the magnitude of said analog signal produced by dusk;

comparator means having inputs coupled to simultaneously receive said analog signal and said reference voltage for generating a first control signal indicating when said ambient light intensity corresponds to dusk;

timer means for generating a second control signal after a manually selectable time delay in response to the initial occurrance of said first control signal; and a first electromagnetic switch operable in response to said first control signal to indicate full darkness for energizing electric signs and parking lot lights for said store, and a second electromagnetic switch operable in response to said second control signal for de-energizing a uniformly distributed portion of all interior overhead lighting in said store.

* * * * *